(No Model.) 2 Sheets—Sheet 1.

L. D. McINTOSH.
HELIOSTAT.

No. 250,672. Patented Dec. 13, 1881.

Witnesses:
G. L. Ayres
Albert H. Adams

Inventor:
Lyman D. McIntosh

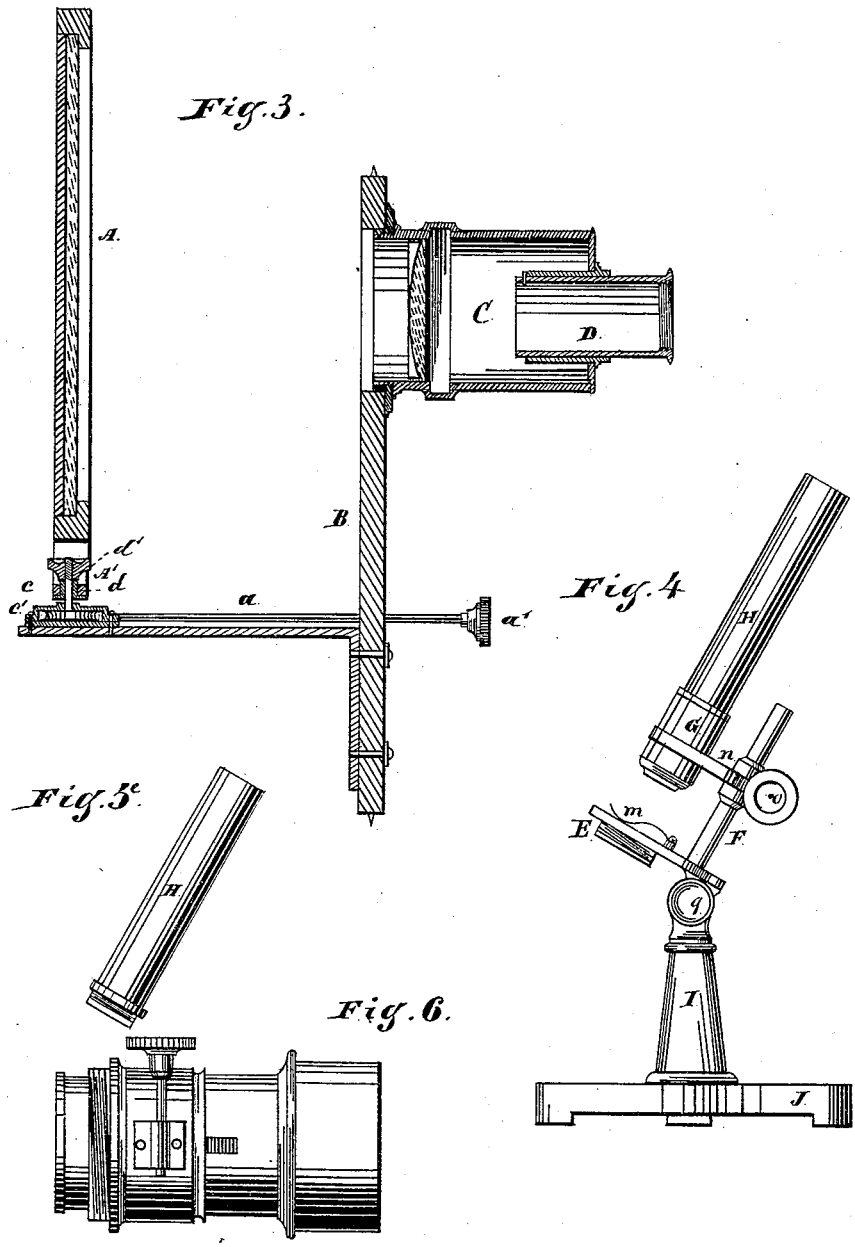

United States Patent Office.

LYMAN D. McINTOSH, OF WASECA, MINNESOTA.

HELIOSTAT.

SPECIFICATION forming part of Letters Patent No. 250,672, dated December 13, 1881.

Application filed March 14, 1881. (No model.)

*To all whom it may concern:*

Be it known that I, LYMAN D. McINTOSH, residing at Waseca, in the county of Waseca and State of Minnesota, and a citizen of the United States, have invented new and useful Improvements in Stereopticons and Solar Microscopes, of which the following is a full description, reference being had to the accompanying drawings, in which—

Figure 1:
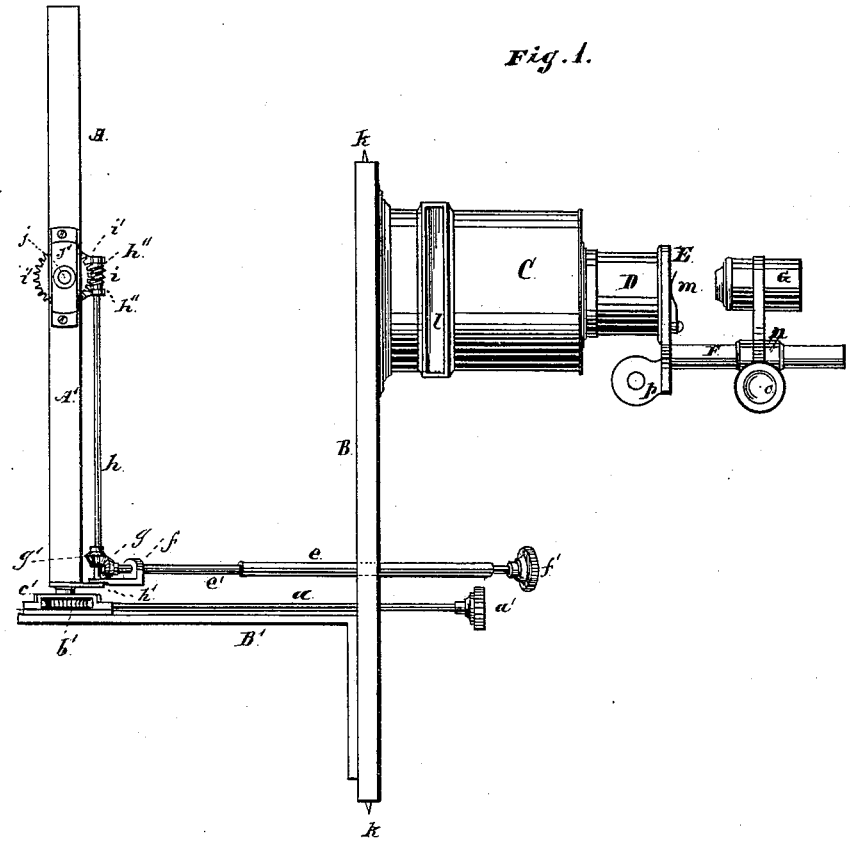
Figure 2:
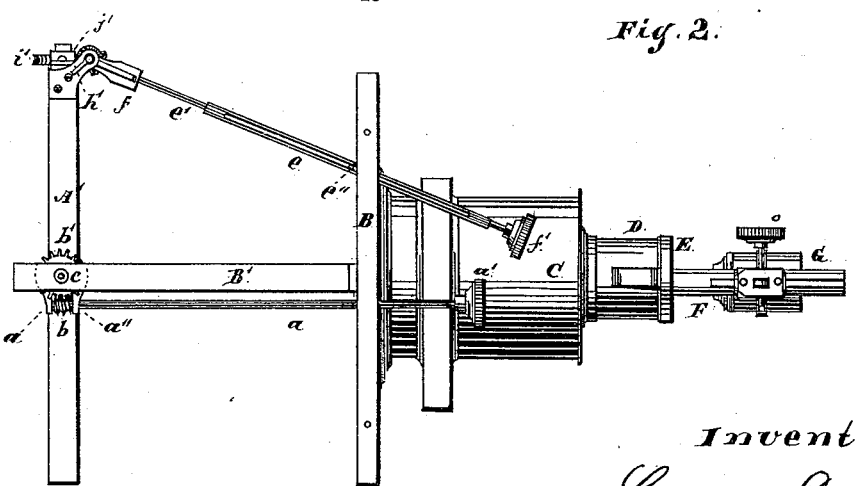

Figure 1 is a side elevation, showing the arrangement of the several parts when the device is to be used as a solar microscope; Fig. 2, an under side or bottom view of the arrangement shown in Fig. 1; Fig. 3, a vertical longitudinal section, showing the arrangement of the device as a stereopticon, the objective being removed; Fig. 4, a detail showing the objective of the solar microscope, its tube and support removed, and arranged on a stand for use as a monocular or ordinary microscope; Fig. 5, a detail showing the eye-tube for changing the solar to a monocular microscope; Fig. 6, a detail showing the objective tube of the stereopticon.

This invention relates to the adjustment of a mirror in relation to a condensing or concentrating lens for use in connection with the objective lens of either a stereopticon or a solar microscope, for the purpose of obtaining the full force and effect and entire benefit of the rays of the sun, and attaining the best results in the use of the instruments; and it relates, also, to the construction, arrangement, and operation of the mirror and its adjusting devices, the condensing-lens, its tube, and tube for adjusting the focal distance, and receiving the objective lens of either the stereopticon or the solar microscope, and arranging the solar microscope so to be readily changed and adapted for use as a monocular microscope; and has for its object the attainment of the several features to which the invention relates in a reliable and efficient manner, and by the employment of devices simple in construction and easily and quickly operated, and arranged and combined to produce the most beneficial and accurate results; and its nature consists in providing a mirror supported in a stirrup or frame, and having horizontal and vertical axes, the horizontal axis being formed by journals or trunnions located on the sides of the mirror-frame, and entering suitable bearings in the side bars of the stirrup, and the vertical axis being formed by a pin or pivot connecting the stirrup to its support, for changing the inclination of the mirror both horizontally and vertically to reflect the rays of the sun and cause them to pass through the condensing or concentrating lens and the objective; in providing a pinion located on one of the horizontal axes, and gearing with a screw on a vertical rod, on which is located a beveled-gear wheel, which meshes with a corresponding wheel on a horizontal sliding rod for adjusting the mirror on its horizontal axis; and in providing a pinion located on the pin or point of the stirrup or frame and gearing with a screw on a horizontal rod for adjusting the mirror on its vertical axis.

In the drawings, A represents the mirror; A', the stirrup or frame; B, the blind or shade; B', the support or angle-iron to which A' is pivoted; C, the main or stationary tube of the condensing-lens; D, the sliding or focus-adjusting tube; E, the connecting-plate for the solar microscope; F, the rack-bar on which the microscope can be adjusted; G, the tube of the solar microscope; H, the eye-tube for changing the solar to a monocular microscope; I, the standard or post to support the monocular microscope; J, the base or stand for the post I; $a$, the horizontal rod for changing the angle of the mirror on its vertical axis; $a'$, the button or head for operating the rod $a$; $b$, the screw or screw-thread on the rod $a$; $b'$, the pinion on the pin or pivot of the stirrup A'; $c$, the pin or pivot for the stirrup or frame A'; $c'$, the plate or support for the pinion $b'$; $d$, the bearing in the stirrup A' for the pin or pivot $c$; $d'$, the set-nut for securing and retaining the stirrup A' on its pivot; $e$, the slotted tube for the sliding rod; $e'$, the sliding rod; $e''$, the guide-pin; $f$, the plate or bearing for the rod $e'$; $f'$, the button or head for operating the tube $e$ and rod $e'$; $g\,g'$, the beveled-gear wheels; $h$, the vertical connecting-rod; $h'$, the bearing-plate for the lower end of the rod $h$; $h''$, the lugs or ears for supporting the upper end of the rod $h$; $i$, the screw or screw-thread on the upper end of the rod $h$; $i'$, the pinion on the journal or trunnion of the mirror; $j$, the journal or trunnion of the mirror; $j'$, the plate or support for the pinion $i'$; $k$, the points on the blind or shade for securing it in position; l, the opening or receptacle in the tube C; m, the springs on the plate E for holding an object; n, the slide carrying the tube of the microscope; o, the thumb-screw for moving the slide and adjusting the microscope; p, the ears or lugs on the plate E for attaching the microscope to the post I; q, the set-screw for securing the microscope to the post I.

The mirror A may be of any of the usual and well-known forms of construction for mirrors to be placed outside of a window or other opening and used for the purpose of reflecting the rays of the sun in connection with a stereopticon or a solar microscope. It is mounted in a stirrup or frame, A', consisting of a horizontal or bottom piece and vertical or side pieces, the side pieces supporting the mirror, so as to allow it to swing free and clear. This stirrup may be made of a single piece of iron or other material which can be bent into the required shape, or it may be made of separate pieces of of any suitable material, connected together in any suitable manner. The mirror is suspended in the stirrup or frame by means of suitable journals or trunnions, attached one to each side piece of the mirror-frame, and arranged to enter an opening or bearing in the upper end of each side bar of the stirrup, or by a pin or pivots passing through each side bar of the stirrup and entering the side piece of the mirror-frame, the trunnions or the pins forming the horizontal axes for the mirror. One of these axes, j, projects beyond the outer face of the side bar, and on this projecting end is firmly secured a pinion or gear-wheel, i,' which engages with a screw or screw-thread, i, on the upper end of a vertical rod, h. The wheel i' located in a frame or housing, j', attached to the side bar of the stirrup, the axis j of the wheel i' having its bearing in said housing. The wheel i' is by this means retained in proper relation to the screw i to provide for their efficient operation at all times.

The rod h extends up parallel, or nearly so, with the side bar of the stirrup, and its upper end is supported or has its bearing in lugs or ears h'', formed on the base-plate of the frame j', between which ears the screw or screw-thread i is located, while its lower end is stepped or journaled in a plate or support, h', attached to the corner of the stirrup, by which means the rod is supported in a vertical position, and the engagement of the screw i with the pinion is insured; but some other arrangement for attaching and supporting the rod h can be used. On this rod h, near its lower end, is firmly secured a beveled-gear wheel, g', which meshes with a beveled-gear wheel, g, located on the end of a rod, e', which rod is supported at this end and has its bearing in a swinging bracket or plate, f, formed, as shown, of a single piece bent so as to have a horizontal portion and a vertical portion, the vertical portion having a suitable opening or bearing for the rod e', and the horizontal portion having its outer end pivotally connected with the rod h, and resting on the plate h', so that the bracket is free to swing in a horizontal plane from the rod h as a pivot, and adjust itself to the position of the stirrup or frame A', and have the gear-wheel g mesh with the gear-wheel g' in whatever position the frame or stirrup may be adjusted. The other end of this rod e' enters a tube, e, and is provided with a pin, e'', which projects into a longitudinal slot in the tube, and forms a connection which will allow the rod to slide in and out of the tube, and cause the tube, when revolved, to revolve the rod. The rod and tube are located in a horizontal, or nearly horizontal, plane, and the tube extends back and passes through a suitable opening in the blind or shade B, and its inner end is provided with a head or other device, f', by means of which it can be turned or revolved, so as to turn or revolve the rod e', and through it the gear-wheel g, which in turn drives the gear-wheel g', and turns or revolves the rod h, which causes the screw i to revolve the wheel i', and turn or swing the mirror on its horizontal axis through the axis j. By means of these devices the mirror can be turned on its horizontal axis to any desired angle of inclination, and the adjustment can be made very accurate, and to the exact degree required to adjust it on said axis to reflect the rays of the sun through the condensing-lens and the objective.

The stirrup or frame A' is pivotally attached at the center of its cross or horizontal bar to the outer end of a support, B', the other end of which is secured to the face of the shade or blind B. As shown, the support B' consists of a single piece, bent so as to have a horizontal portion to support the stirrup and vertical portion for attachment to the blind; but other forms of support may be used.

The pivot c, for the stirrup, is located at the outer end of the support B at the proper point to bring the mirror in correct relation to the condensing-lens, and outside of the window or opening in which the blind or screen B is located, and forms the vertical axis for the mirror. This axis or pivot c is journaled or has a bearing in the end of the support, so that it is free to turn or revolve, and on its shank or body is firmly secured a pinion, b', which engages with a screw or screw-thread, b, on the end of a rod, a. This pinion b' is located in a housing or frame, c', located on the end of the support, and corresponding, as shown, in form, construction, and arrangement to the frame or housing j', and for the same purpose. The axis or pivot c passes through the plates of the housing, and has a bearing therein, and projects above the housing, and to its projecting end is firmly secured the base or horizontal bar of the stirrup. As shown, the connection is made by passing the end of the pin or pivot through a lock plate or nut, d, which will turn with the pin, and attaching or connecting the plate *d* to or with the cross-bar, and then securing it in position by a set-nut, *d'*; but other forms of connection may be used that will cause the pin or pivot when revolved to turn the stirrup or frame.

The rod *a* is located in a horizontal, or nearly horizontal, plane, and its outer end is supported or its bearing in lugs or ears *a''*, projecting out from the frame or housing, between which ears the screw-thread is located, and its inner end is supported or has its bearing in the blind or shade B, and is provided with a head or other device, *a'*, by means of which it can be turned or revolved, so as to cause the screw *b* to revolve the wheel *b'* and the pivot *c*, and turn the mirror on its vertical axis. By means of these devices the mirror can be turned on its vertical axis to any desired angle, and the adjustment can be made very accurate and to the precise point required to adjust it on said axis to reflect the rays of the sun through the condensing-lens and the objective; and in order to permit of the adjustment on both the horizontal and vertical axes, the connecting-rod for working the horizontal axis, adjusting devices must be constructed so that it can lengthen or shorten to conform to the position of the mirror on its vertical axis, for which purpose this rod is made in two sections, so that it can slide in or out, and any other form of sliding rod than that shown may be used.

The blind or shade B may be made of wood or other suitable material through which the light will not penetrate, and is secured in the window or opening in any suitable manner. As shown, sharp pins or points *k* are provided on the ends, which enter the window sash and frame and retain the shade in position.

The tube C is of the required diameter to receive the condensing or concentrating lens, and may be made of brass or other suitable material. This tube is provided with a transverse opening, *l*, back of the lens, to receive a slide holding the views or object to be projected, which opening is arranged and located with reference to the lens, to bring the object within the proper focus, in the usual manner. Sliding in this tube is a smaller tube D, the outer end of which is screw-threaded for the attachment of the objective of a stereopticon solar microscope, the tube enabling the focal distance between the condensing-lens and the objective to be changed or adjusted to properly project the object or image on the receiving-screen.

The solar microscope consists of the plate or stage E, rack-bar F, and lens-tube G, clamping-springs *m*, slide *n*, carrying the tube G, and thumb-nut *o*, for operating a pinion engaging the rack of the bar, and adjusting the tube G by moving the slide *n* on F. These parts may be of any of the usual and well-known forms of construction for such parts, arranged and operating as usual, except that the stage or plate E has an annular boss or ring with a central opening, and exterior screw-thread for attaching the microscope to the tube D and allowing the light to pass through the objective, and is provided with an ear or eye, *p*, by means of which the solar microscope, when removed from the tube D, can be attached to a base and standard, and by the addition of an eye-tube, H, be used as a monocular microscope.

The standard or post I has at its upper end ears or eyes, between which the ear or eye *p* will pass, so that by means of a pin or thumb-screw, *q*, the tube G, and the other devices connected therewith can be pivotally connected with the post to operate as an ordinary monocular microscope. This post I is attached to or connected with a base, J, in any suitable manner.

The eye-tube H is constructed as usual, and when attached to the tube G the instrument can be used in the usual manner as a monocular microscope. This tube H could be attached to the tube G when the latter is connected with the tube D, in which case the sunlight can be shut off to permit the use of the device as a microscope.

The stereopticon objective may be of any of the usual and well-known forms of construction, the end of its tube having a screw-thread for attaching the instrument to the tube D.

When using the device as a stereopticon the objective of the stereopticon is screwed into the sliding tube D and adjusted to the proper focal distance, and the mirror adjusted on its horizontal and vertical axes by the devices described, so as to reflect the sun's rays through the condensing-lens and the objective. The views are placed on the slide and inserted in succession in the opening *l*, the slide being so constructed and arranged as to properly center each one, and the image will be projected on the receiving-screen in the usual manner.

When using the solar microscope the stereopticon objective is removed and the microscope screwed into the tube D. The draw or slide tube D is adjusted to obtain the focal distance between the condensing-lens and the objective, and the mirror adjusted by the devices described to pass the rays of the sun through the lenses. A mounted object is then placed under the springs *m* on the stage or plate E, as usual, and the focus adjusted by the thumb-nut *o*, and a clear and well-defined image will be seen on the receiving-screen.

The receiving-screen is not shown, but is to be arranged and located in the usual manner to receive the projected image.

What I claim as new, and desire to secure by Letters Patent, is as follows:

1. In a heliostat, the combination of the sliding rod *e e'*, support *f*, wheels *g g'*, rod *h*, and screw or screw-thread *i* with the wheel or pinion *i'*, journal *j*, mirror A, and stirrup A', substantially as and for the purpose described.

2. In a heliostat, the combination of the rod $a$ and screw or screw-thread $b$ with the pin or pivot $c$, wheel or pinion $b'$, mirror A, and stirrup or frame A', substantially as and for the purpose described.

3. In a heliostat, the combination of the sliding rod $e$ $e'$, swinging support $f$, gear-wheels $g$ $g'$, rod $h$, screw or screw-thread $i$, wheel or pinion $i'$, journal $j$, the rod $a$, screw or screw-thread $b$, wheel or pinion $b'$, and pin or pivot $c$ with a mirror, A, and frame or stirrup A', substantially as and for the purpose described.

LYMAN D. McINTOSH.

Witnesses:
 O. W. BOND,
 B. A. PRICE.